United States Patent [19]

Suzuki et al.

[11] Patent Number: 5,289,290
[45] Date of Patent: Feb. 22, 1994

[54] FACSIMILE APPARATUS WITH IMPROVED TRANSMISSION FUNCTION OF DUPLEX ORIGINAL

[75] Inventors: Hiroyuki Suzuki; Akio Nakajima, both of Toyokawa; Hideo Muramatsu, Shinshiro; Kanako Hamano, Hirakata, all of Japan

[73] Assignee: Minolta Camera Kabushiki Kaisha, Osaka, Japan

[21] Appl. No.: 722,932

[22] Filed: Jun. 28, 1991

[30] Foreign Application Priority Data

Jul. 3, 1990 [JP] Japan .................................. 2-176626
Jul. 3, 1990 [JP] Japan .................................. 2-176627

[51] Int. Cl.$^5$ .............................................. H04N 1/00
[52] U.S. Cl. ..................................... 358/440; 358/444; 358/434; 358/468; 358/438; 358/497
[58] Field of Search ............... 358/496, 440, 474, 498, 358/438, 444, 434, 404, 468, 407, 471, 497

[56] References Cited

U.S. PATENT DOCUMENTS 4,905,098  2/1990  Sakata ................... 358/496
5,157,521  10/1992  Chung ................... 358/496

OTHER PUBLICATIONS

Brochure entitled NEC NEFAX D45, Dec. 1988.

*Primary Examiner*—Edward L. Coles, Sr.
*Assistant Examiner*—Fan Lee
*Attorney, Agent, or Firm*—Willian Brinks Hofer Gilson & Lione

[57] ABSTRACT

A facsimile apparatus according to the present invention includes a detecting device for detecting that originals are placed on a placing portion, a transmitting destination setting device for setting a destination to which the images of the originals placed on the placing portion are transmitted, a reading device for reading images of the originals placed on the placing portion to output an image signal, transmitting device for transmitting the image signal outputted from the reading device to the set destination, a mode specifying device for specifying a mode in which after transmitting the image signal of the first group of originals placed on the placing portion, an image signal of the second group of originals placed on the placing portion different from the first group of originals is transmitted to the same transmission destination as the first originals, and controlling device for controlling the transmitting device so that an image signal of the placed originals is transmitted to the destination when the destination is set and originals placed on the placing portion are detected, and for controlling the transmitting device so that, when a predetermined mode is specified, when it is detected that the second group of originals are placed on the placing portion after transmitting the image signal of the first group of originals to the destination, the image signal of the second group of originals is transmitted to the transmission destination the same as the transmission destination of the first group of originals.

11 Claims, 17 Drawing Sheets

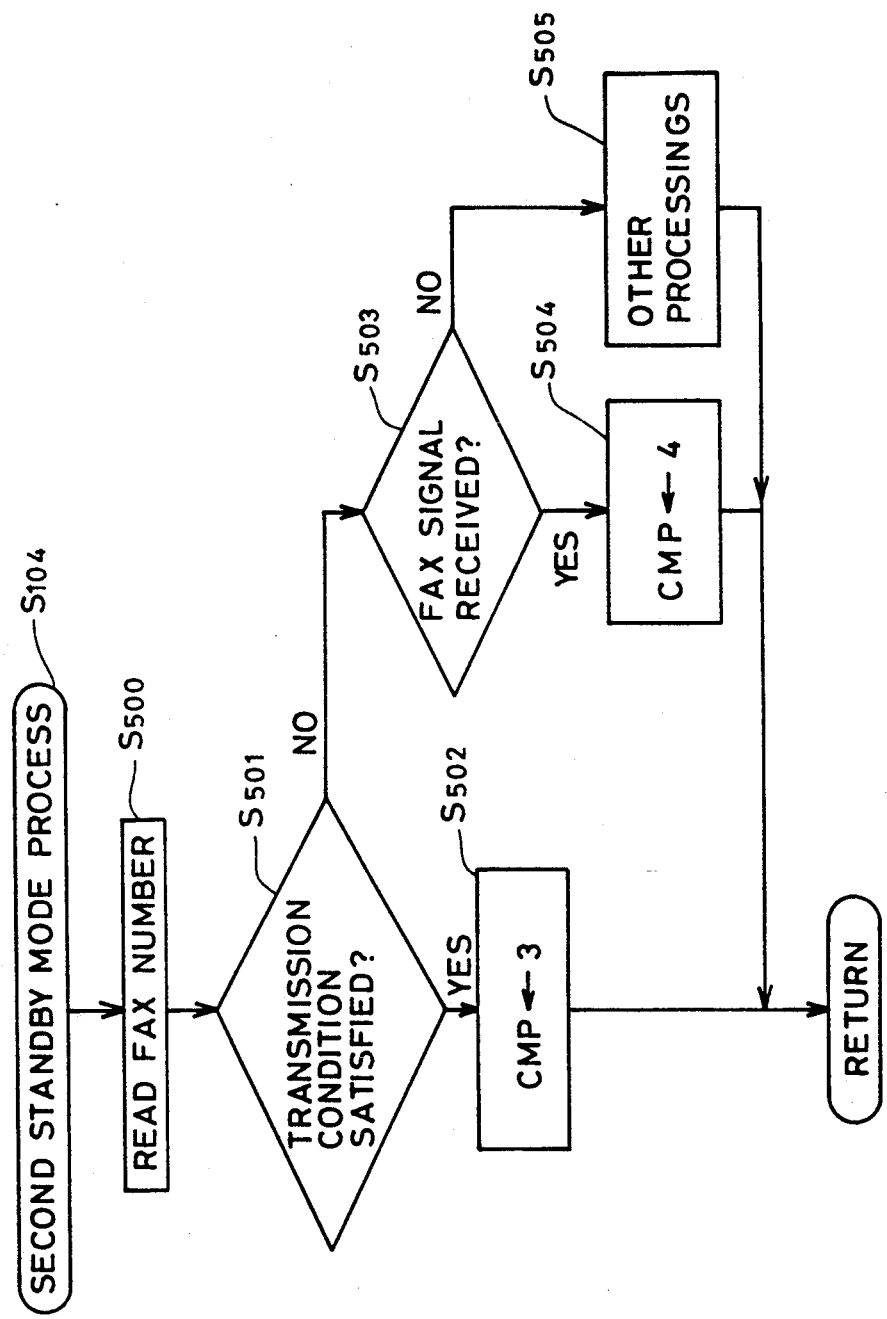

FIG.12 B
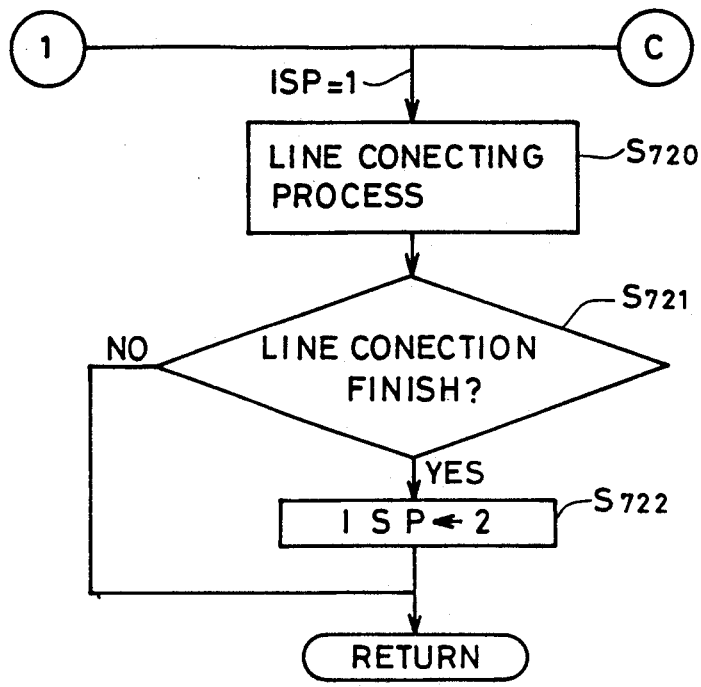
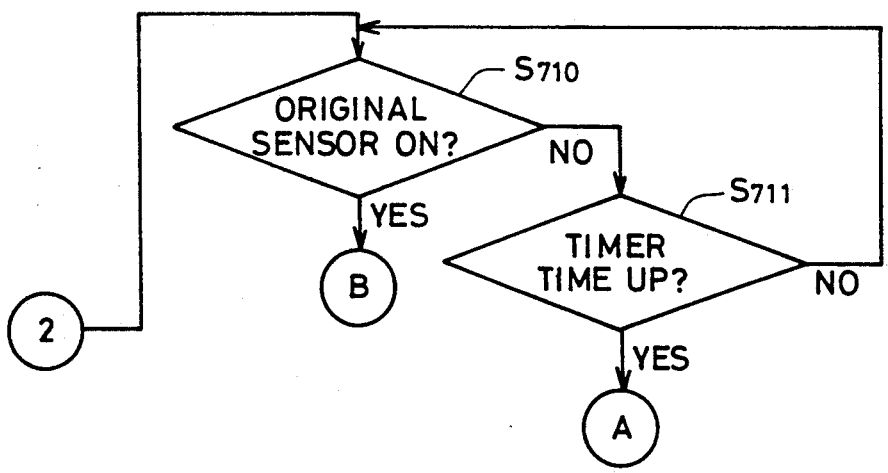

FACSIMILE APPARATUS WITH IMPROVED TRANSMISSION FUNCTION OF DUPLEX ORIGINAL

BACKGROUND OF THE INVENTION

1. Field of the Invention

The present invention relates to facsimile apparatus, and particularly to facsimile apparatus capable of transmitting originals on both sides of which images to be transmitted are formed (hereinafter, referred to as a duplex original) with simple operation.

2. Description of the Related Art

Facsimile apparatus provided with auto document feeders (ADF) for transmitting image data of a plurality of originals have been conventionally used.

In the conventional facsimile apparatus, a telephone number of a facsimile apparatus (hereinafter, referred to as a facsimile number) of a destination party is inputted after originals are placed on an original tray of an ADF device. A line connecting process is made with the facsimile apparatus on the other party by depressing a transmission key, and then the ADF device feeds the plurality of originals to an image reading portion one by one. The image data of images read in the image reading portion is converted into a predetermined facsimile signal and transmitted to the facsimile apparatus on the other party through a telephone line. When the image data of all the originals placed on the original tray has been transmitted, a line disconnecting process is performed. A conventional facsimile apparatus is configured as described above.

When transmitting image data of a duplex original using this kind of conventional facsimile apparatus, image data of a front side of the duplex original is transmitted first, and next image data on a back side of that duplex original is transmitted.

SUMMARY OF THE INVENTION

It is an object of the present invention to facilitate transmission of a duplex original in facsimile apparatus.

It is another object of the present invention to speed up transmission of a duplex original in facsimile apparatus.

It is still another object of the present invention to reduce the labor on a receiving side in transmission of a duplex original in facsimile apparatus.

It is yet another object of the present invention to avoid line disconnection in the course of transmission of a duplex original in facsimile apparatus.

It is still another object of the present invention to transmit a duplex original by inputting a facsimile number of the other party only once in facsimile apparatus.

In order to achieve the above-described objects, a facsimile apparatus in accordance with one aspect of the present invention includes a placing portion on which an original to be transmitted is placed, detecting means for detecting that the original is placed on the placing portion, transmission destination setting means for setting a destination to which an image of the original placed on the placing portion is to be transmitted, reading means for reading the image of the original placed on the placing portion to output an image signal, transmitting means for transmitting the image signal outputted from the reading means to the transmission destination set by the setting means, mode specifying means for specifying a mode in which an image signal of an original in a first group placed on the placing portion is first transmitted to the transmission destination set by setting means, and subsequently an image signal of an original in a second group, which is different from that in the first group, placed on the placing portion is transmitted to the transmission destination same as that of the first group original, control means for controlling the transmitting means so that the image signal of the original placed on the placing portion is transmitted to the transmission destination when the transmission destination is set by the setting means and also it is detected by the detecting means that the original is placed on the placing portion, and controlling the transmitting means so that an image signal of the original in the second group is transmitted to the same transmission destination as that to which the image signal of the original in the first group is transmitted if a mode is specified by mode specifying means and the detecting means detects that the original in the second group is placed on the placing portion after the image signal of the original in the first group has been transmitted to the transmission destination set by the setting means.

In a facsimile apparatus configured as described above, when a predetermined mode is specified, an original image of the second group placed on the placing portion is transmitted to the same transmission destination as that for an original in the first group after an image of the original in the first group has been transmitted, so that transmission of duplex originals is facilitated.

In order to achieve the above objects, a facsimile apparatus in accordance with a certain aspect of the present invention includes a placing portion on which an original to be transmitted is placed, detecting means for detecting that the original is placed on the placing portion, transmission destination setting means for setting a destination to which the image of the original placed on the placing portion is transmitted, reading means for reading the image of the original placed on the placing portion to output image data corresponding to the read image, storing means for storing image data outputted from the reading means, transmitting means for converting the image data stored in the storing means into an image signal and transmitting the image signal to the transmission destination set by the setting means, a mode specifying means for specifying a mode in which image signals of the original in the first group and the original in the second group placed on the placing portion are alternately transmitted, and controlling means for controlling storing means so that image data of the original in the first group placed on the placing portion is stored in the storing means in response to setting of the transmission destination by the setting means and detection by the detecting means and subsequently the image data of the original in the second group placed on the placing portion is stored in the storing means in response to detection by the detecting means, and controlling transmitting means so that the image data of the original in the first group and the second group stored in the storing means are alternately read out and the read out image data are converted into image signals and transmitted to the transmission destination set by the setting means.

In a facsimile apparatus configured as described above, when a predetermined mode is specified, the image data of the original in the first group and the second group stored in the storing means are alternately read out to be transmitted to the transmission destination, so that the burden on the receiving side is reduced.

Although the present invention has been described and illustrated in detail, it is clearly understood that the same is by way of illustration and example only and is not to be taken by way of limitation, the spirit and scope of the present invention being limited only by the terms of the appended claims.

BRIEF DESCRIPTION OF THE DRAWINGS

FIG. 8 is a flow chart showing specific contents of a second standby mode process routine of FIG. 5.

DESCRIPTION OF THE PREFERRED EMBODIMENTS

A facsimile apparatus in the first embodiment of the present invention will be described below referring to the figures in the order of items cited below.
 (a) structure of facsimile apparatus
 (b) operation panel
 (c) main controlling portion
 (d) processing in facsimile apparatus
  (d-1) main routine
  (d-2) input/output process
  (d-3) first standby mode process
  (d-4) second standby mode process
  (d-5) both-sides transmission mode process A facsimile apparatus according to the present embodiment is characterized by having a both-sides transmission mode in which, when transmitting a duplex original, after a first placing operation of setting a facsimile number of the other party and also placing an original on an original tray 21 for transmitting a front side of the original, a second placing operation of placing the original on original tray 21 for transmitting a back side of the original is performed without setting the facsimile number of the other party again, and thereby the back side of the original can be transmitted to the facsimile apparatus on the other party to which the front side of the original has been transmitted.

(a) structure of facsimile apparatus

Figure 1:
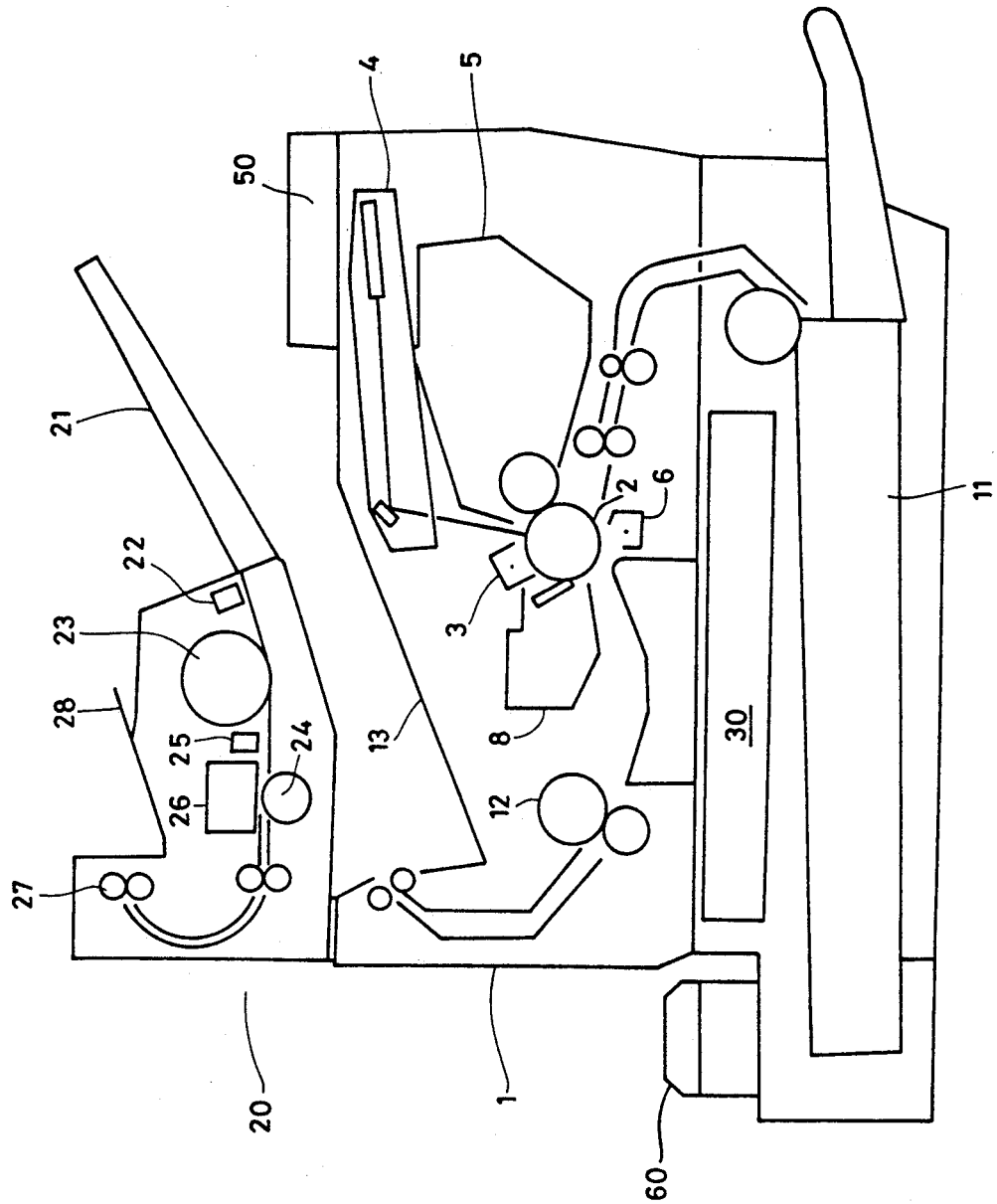
FIG. 1 is a sectional diagram of a facsimile apparatus according to the first embodiment of the present invention.

FIG. 1 is a sectional diagram of a facsimile apparatus of the first embodiment of the present invention. The facsimile apparatus is generally divided into a printer portion 1 and a reading portion 20 provided thereabove, wherein an operation panel 50 is provided on printer portion 1 and also a telephone machine 60 is provided on a side surface portion of printer portion 1.

Printer portion 1 is an electrophotographic type laser beam printer having structure same as that of a conventional apparatus, of which operation will be briefly described below. First, the photoreceptor on a photoreceptor drum 2 which is rotationally driven is uniformly charged by a charger 3. Next, a laser beam is irradiated according to the image data by an optical system 4 to form an electrostatic latent image on photoreceptor drum 2. The toner of a developing device 5 sticks to the electrostatic latent image. Whereas, cut paper are provided in paper feed cassette 11, which are fed toward photoreceptor drum 2 one by one by a roller or the like. The toner sticked to photoreceptor drum 2 is transferred to the cut paper by a transfer charger 6 and fixed by a fixing device 12, and then the cut paper is discharged to a paper discharge tray 13. The toner which did not stick to is re-collected by a cleaner 8, and thus a single time of printing is finished.

Next, operation of reading portion 20 will be described. Originals to be transmitted are read similarly to in a conventional apparatus. That is to say, originals placed on original tray 21 are detected by an original sensor 22 and fed to the position of a sensor 25 one by one by a roller 23. Next, the originals are read by a linear image sensor 26 in synchronization with the rotation of roller 24 by a motor (not shown) and reading by the linear image sensor 26, and the original images are converted into digital image data. After finishing reading, the originals are discharged into paper discharge tray 28 by discharge roller 27.

Figure 2:
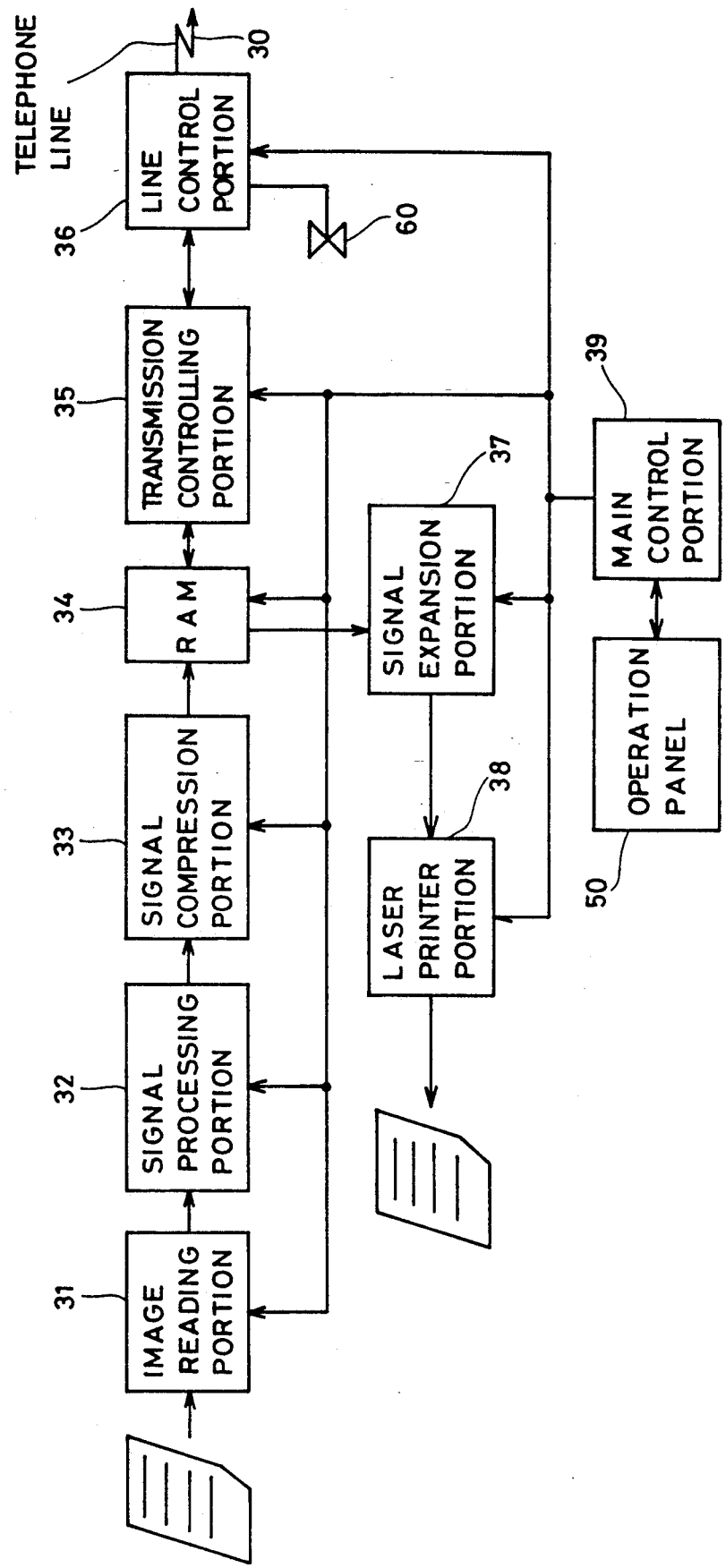
FIG. 2 is a block diagram illustrating specific structure of the facsimile apparatus of FIG. 1.

FIG. 2 is a block diagram showing structure of the facsimile apparatus of FIG. 1.

In FIG. 2, image reading portion 31 has linear image sensor 26 shown in FIG. 1, which reads original images, converts the images into an image signal and outputs the signal to a signal processing portion 32. Signal processing portion 32 applies to the inputted image signal an analogue/digital conversion process and data correction process such as a γ conversion process. It then performs a digitalizing process to convert the data into binary image data and outputs it to a signal compression portion 33. Subsequently, signal compression portion 33 performs a compression process of the inputted binary image data according to a predetermined coding system such as a well-known MR cording system or the MH coding system. Then, the image data to be transmitted after the compression process is stored in a random access memory 34 (hereinafter, referred to as RAM).

A transmission control portion 35 has a modulation/-demodulation device, which modulates a carrier signal by a predetermined modulating system with image data stored in RAM 34. The facsimile signal obtained by modulation is transmitted to the facsimile apparatus on the other party through a line controlling portion 36 and a telephone line 30. Furthermore, transmission controlling portion 35 demodulates and converts into image data the facsimile signal received through telephone line 30 and line controlling portion 36 from the facsimile apparatus on the other party, which is then stored in RAM 34.

Line controlling portion 36 having a dialer and a network controlling unit (NCU) performs predetermined telephone line connecting process and disconnecting process in transmitting a facsimile signal to the facsimile apparatus on the other party and receiving a facsimile signal from the facsimile apparatus on the other party, respectively.

A signal expansion portion 37 reads the image data which is received and stored in RAM 34 and applies an expansion process opposite to the process of signal compression portion 33 to the read image data to convert it into an image signal and then outputs the signal to laser printer portion 38. Laser printer portion 38 performs printing operation for every single piece of printing paper as described above according to the inputted image signal.

Main controlling portion 39 conducts processings of the facsimile apparatus as will be described later on the basis of an instruction of an operator inputted with an operation panel 50 and also outputs instruction information to the operator and condition information of the facsimile apparatus to operation panel 50 and makes them displayed therein.

(b) operation panel

Figure 3:
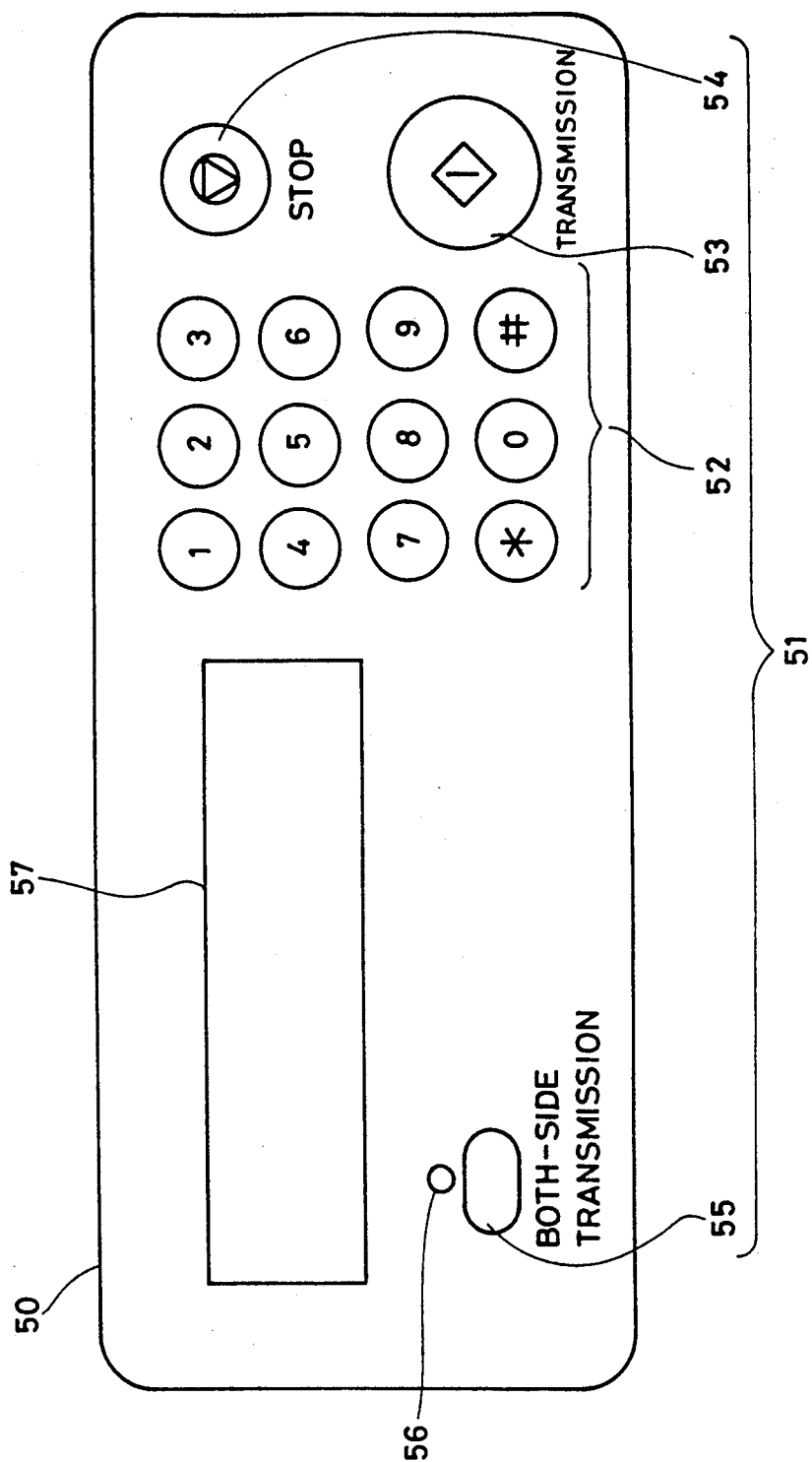
FIG. 3 is a front view of an operation panel of the facsimile apparatus of FIG. 1.

FIG. 3 is a front view of an operation panel 50 of the facsimile apparatus of FIG. 1.

In FIG. 3, operation panel 50 includes a key matrix 51, a light emitting diode (hereinafter, referred to as LED) 56 indicating that a both-sides transmission mode is selected, and a liquid crystal display (hereinafter, referred to as LCD) 57 for displaying a message to an operator.

Key matrix 51 includes 10-key 52 for a telephone machine including numerical keys from "0" to "9", an asterisk key "*" and a sharp key "#" to be used for setting a facsimile number of the other party and the like, a transmission key 53 for instructing to read images of originals placed on original tray 21 and convert the images into facsimile signals to be transmitted, a stop key 54 for instructing to stop a reading process, a transmitting process or a receiving process, and a both-sides transmission key 55 for instructing to select the both-sides transmission mode.

(c) main controlling portion

Figure 4:
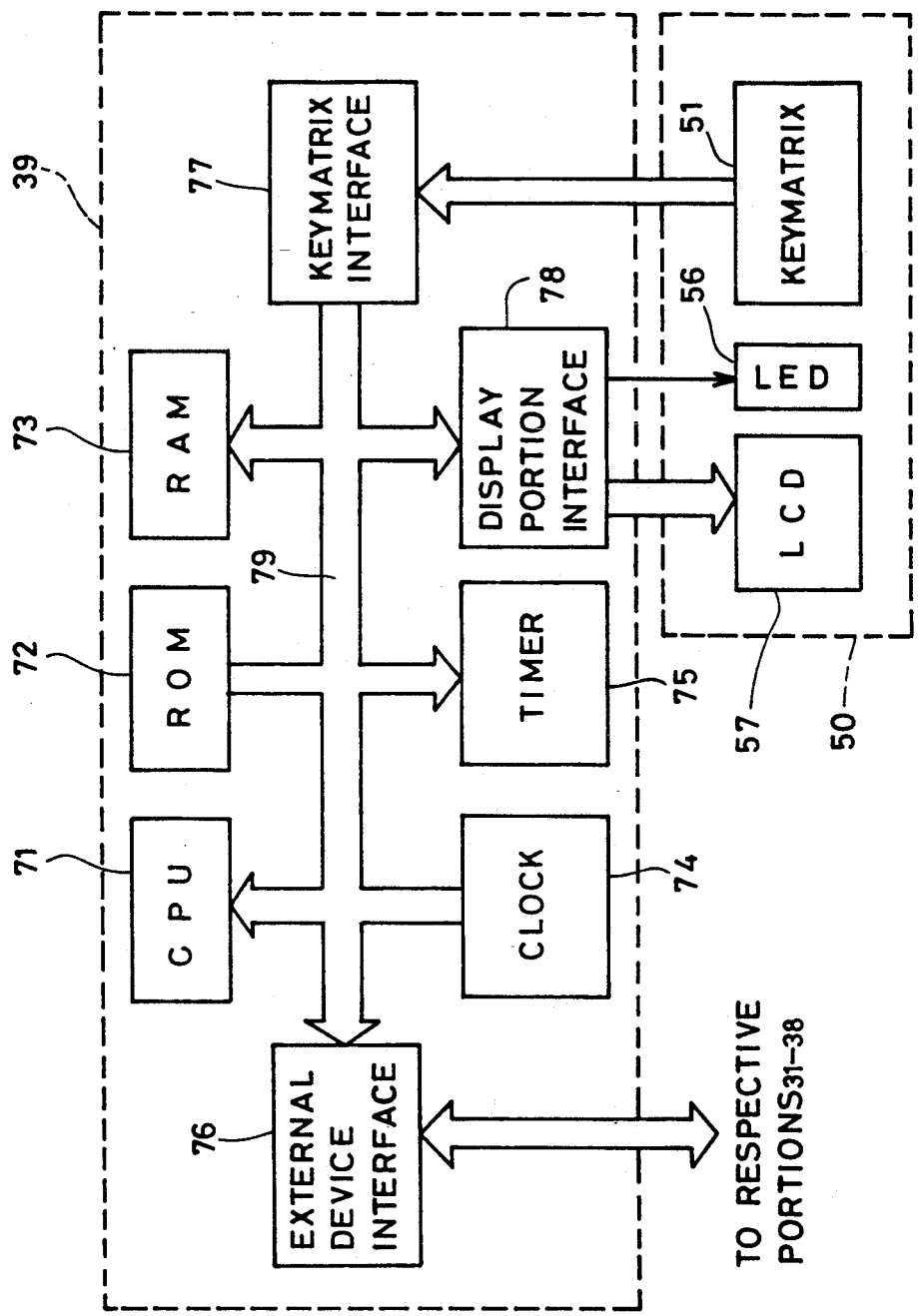
FIG. 4 is a block diagram showing specific structure of the main control portion of FIG. 2 and the operation panel of FIG. 3.

FIG. 4 is a block diagram showing structure of the main control portion 39 of FIG. 2 and the operation panel 50 of FIG. 3.

In FIG. 4, the main controlling portion 39 includes a central processing unit (hereinafter, referred to as CPU) 71 for controlling operation of the facsimile apparatus shown in FIGS. 1 and 2, a read only memory (hereinafter, referred to as ROM) 72 in which the system program for CPU 71 and data necessary for executing the system program are stored, a RAM 73 in which control parameters, flags and various data necessary for executing the system program are stored, a clock circuit 74 for counting the present time, and a timer circuit 75 conducting timing for a predetermined time period and outputting an interruption signal to CPU 71 when the timing is completed.

Main controlling portion 39 further includes an external device interface circuit 76 connected to respective portions 31 through 38 shown in FIG. 2, a key matrix interface circuit 77 connected to a key matrix 51 of operation panel 50, and a display portion interface circuit 78 connected to LED 56 and LCD 57.

In main controlling portion 39, CPU 71, ROM 72, RAM 73, clock circuit 74, timer circuit 75, external device interface circuit 76, key matrix interface circuit 77 and display portion interface circuit 78 are connected to each other through an internal bus 79.

The following parameters, flags and data necessary for executing the system program are stored in the RAM 73.

(1) CMP: a control mode parameter indicating one operation mode set in operation modes of the facsimile apparatus.

(2) BSTF: a both-sides transmission mode flag indicating as to whether a both-sides transmission mode is set or not.

(3) ISP: an internal state parameter controlling the process order in the both-sides transmission mode process (refer to FIGS. 9A–9D) described later.

(4) a facsimile number of the other party.

(d) processing of facsimile apparatus (d-1) main routine

Figure 5:
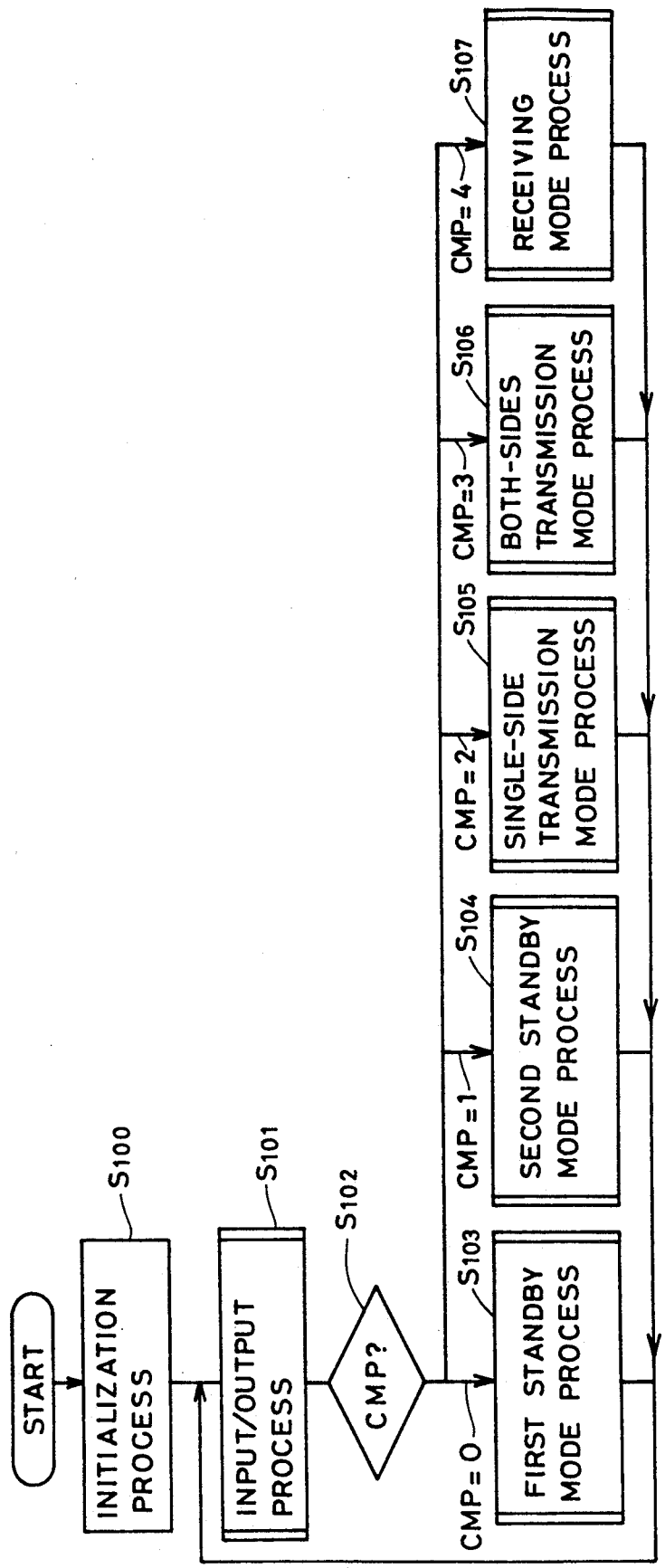
FIG. 5 is a flow chart showing a main routine of the main control portion of FIG. 4.

FIG. 5 is a flow chart showing a main routine of the main controlling portion of FIG. 4.

In FIG. 5, when a power supply of the facsimile apparatus of the present embodiment is turned on, the processings of the main routine are started, in which an initialization process is first conducted in step S100. In the initialization process, the above-described control mode parameter CMP, both-sides transmission flag BSTF and internal state parameter ISP are reset to 0. Subsequently, an input/output process is made in step S101. In the input/output process, the processings of setting both-sides transmission mode flag BSTF and of turning on and off LED 56 on depression of the both-sides transmission key, and processings of setting a facsimile number of a destination and the like are conducted.

Furthermore, in step S102, the control mode parameter CMP is checked, and when the control mode parameter CMP is 0, the flow proceeds to step S103. Then, the first standby mode process is performed such as satisfaction of transmission conditions, receipt of a facsimile signal from the other party, and setting of the control mode parameter CMP according to the both-sides transmission flag BSTF, and it returns to step S101. In step S102, if the control mode parameter CMP is 1, it proceeds to step S104. Then, the second standby mode process is conducted such as satisfaction of transmission conditions, and setting of the control mode parameter CMP according to receipt of a facsimile signal from the other party, and the flow returns to step S101.

Furthermore, in step S102, when the control mode parameter CMP is 2, the flow proceeds to step S105 to conduct a single-side transmission mode process, and then it returns to step S101. In the single-side transmission mode process, a process of connecting a line to a facsimile apparatus on the other party, reading of image data of a one-side original, a process of conversion into a facsimile signal and a process of transmitting the signal are conducted as in the transmission process of a conventional facsimile apparatus.

Furthermore, when the control mode parameter CMP is 3 in step S102, the flow proceeds to step S106 to perform the both-sides transmission mode described later in detail, and then it returns to step S101.

When the control mode parameter CMP is 4 in step S102, the flow proceeds to step S107 to perform the receiving mode process, and then it returns to step S101. In the receiving mode process, a line connecting process from a facsimile device on the other side, receiving process of a facsimile signal and converting process into an image signal, and a printing process are conducted similarly to the receiving process of a conventional facsimile apparatus.

(d-2) input/output process

Figure 6:
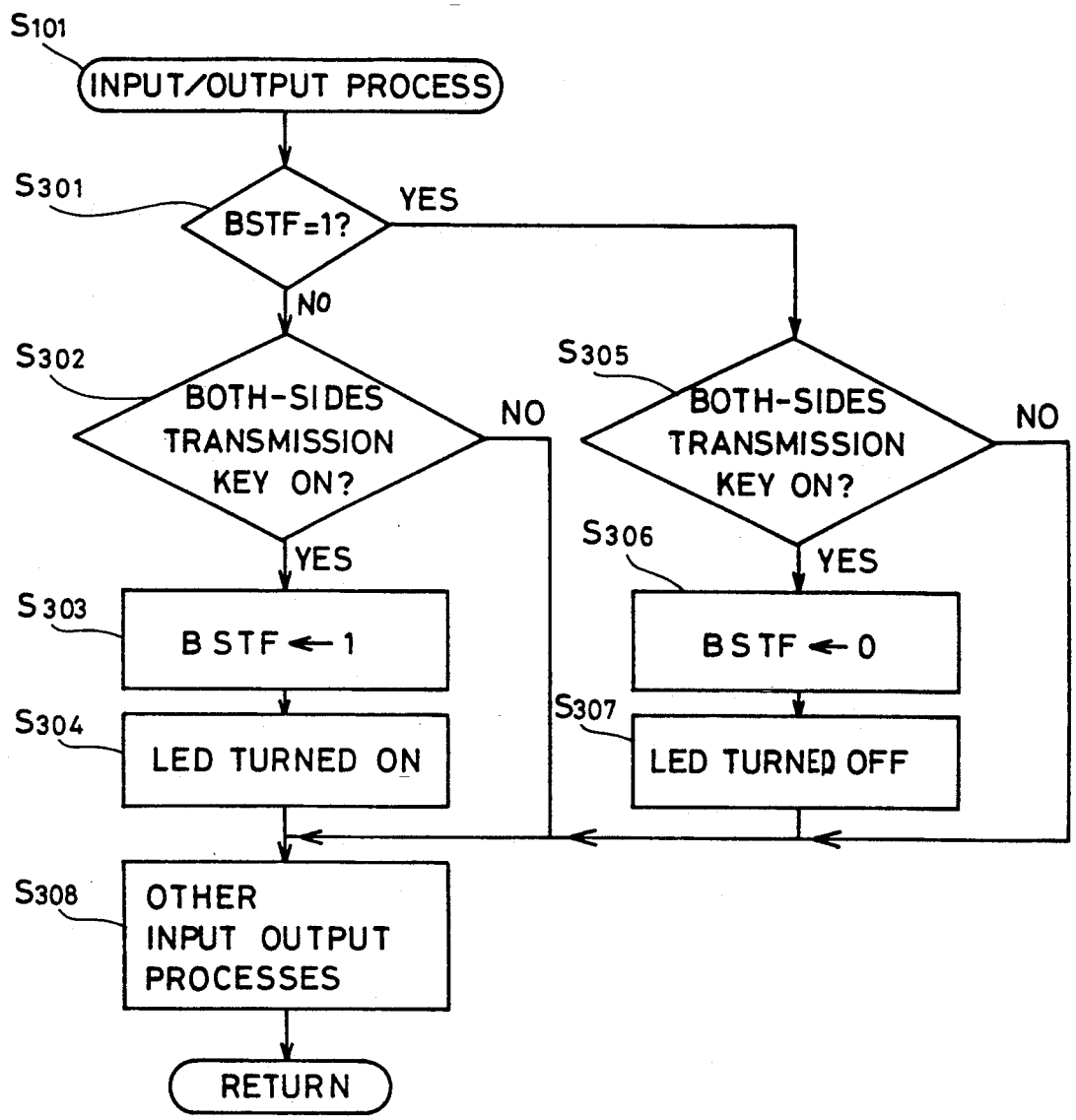
FIG. 6 is a flow chart showing specific contents of an input/output process routine of FIG. 5.

FIG. 6 is a flow chart showing specific contents of an input/output process (step S101) which is a subroutine of FIG. 5.

In FIG. 6, first, a determination is made as to whether a both-sides transmission flag BSTF is 1 or not in step S301. The both-sides transmission flag BSTF is reset to 0 in the initialization process. Here, when the both-sides transmission flag BSTF is not 1 (NO in step S301), it proceeds to step S302, wherein a determination is made as to whether both-sides transmission key 55 is turned on or not. When the both-sides transmission key 55 is on (YES in step S302), the both-sides transmission flag BSTF is set to 1 in step S303, LED 56 on operation panel 50 is turned on, and then it proceeds to step S308. When both-sides transmission key 55 is not on in the step S302 (NO in step S302) it directly proceeds to step S308.

On the other hand, if the both-sides transmission flag BSTF is 1 in step S301 (YES in step S301), the flow proceeds to step S305, wherein a determination is made as to whether both-sides transmission key 55 is turned on or not. Here, if the both-sides transmission key 55 is on (YES in step S305), the both-sides transmission flag BSTF is set to 0 in step S306, then LED 56 of operation panel 50 is turned off in step S307, and it proceeds to step S308. When both-sides transmission key 55 is not on in the step S305 (NO in step S305), the flow directly proceeds to step S308.

Input processes of other keys of operation panel 50 and various sensors, and an output process of operation panel 50 to a display device, etc. are conducted in step S308. In step S308, if a facsimile number on the other party is inputted using ten-key 52 of operation panel 50, the data of the facsimile number is stored in RAM 73. After other input/output processes are completed in the step S308, it returns to the main routine.

(d-3) first standby mode process

Figure 7:
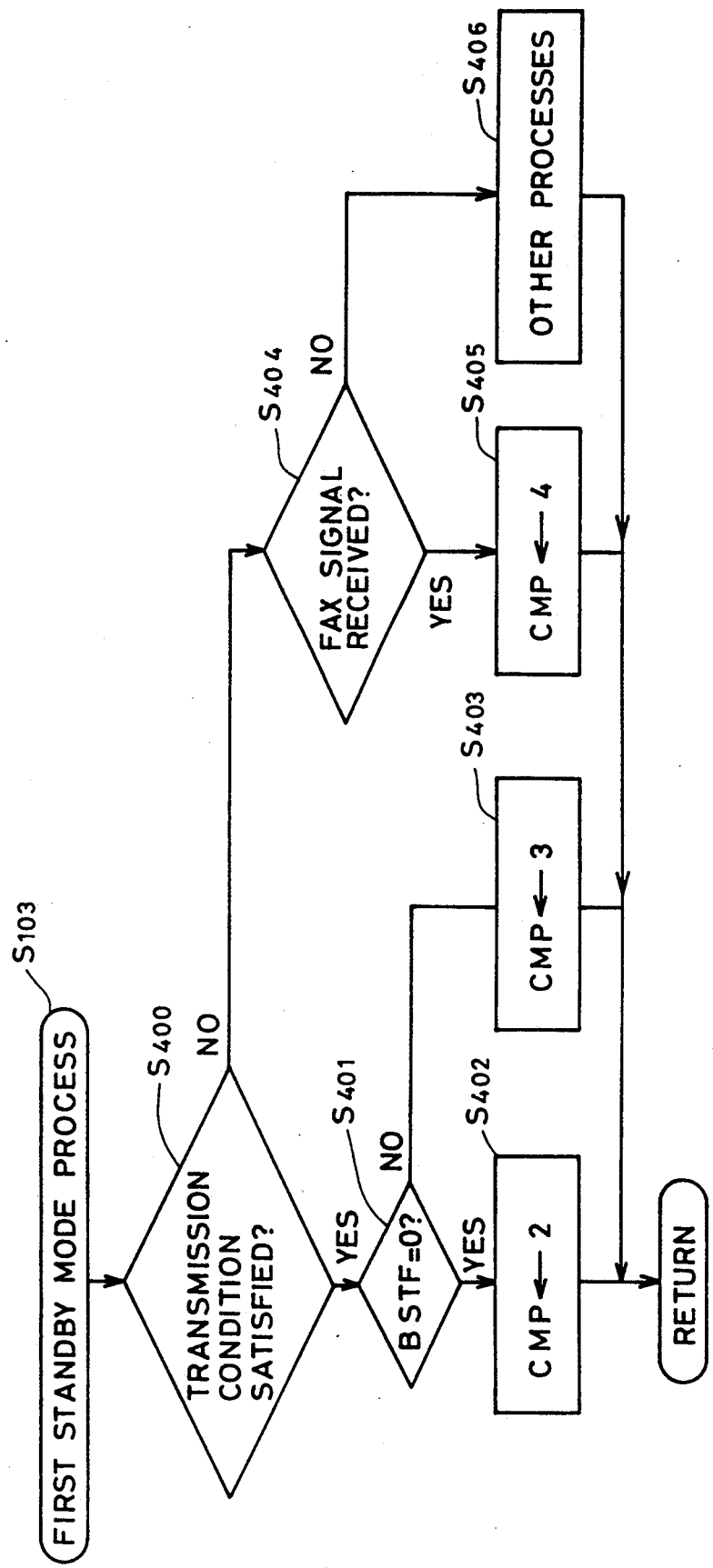
FIG. 7 is a flow chart showing specific contents of a first standby mode process routine of FIG. 5.
Figure 9A:
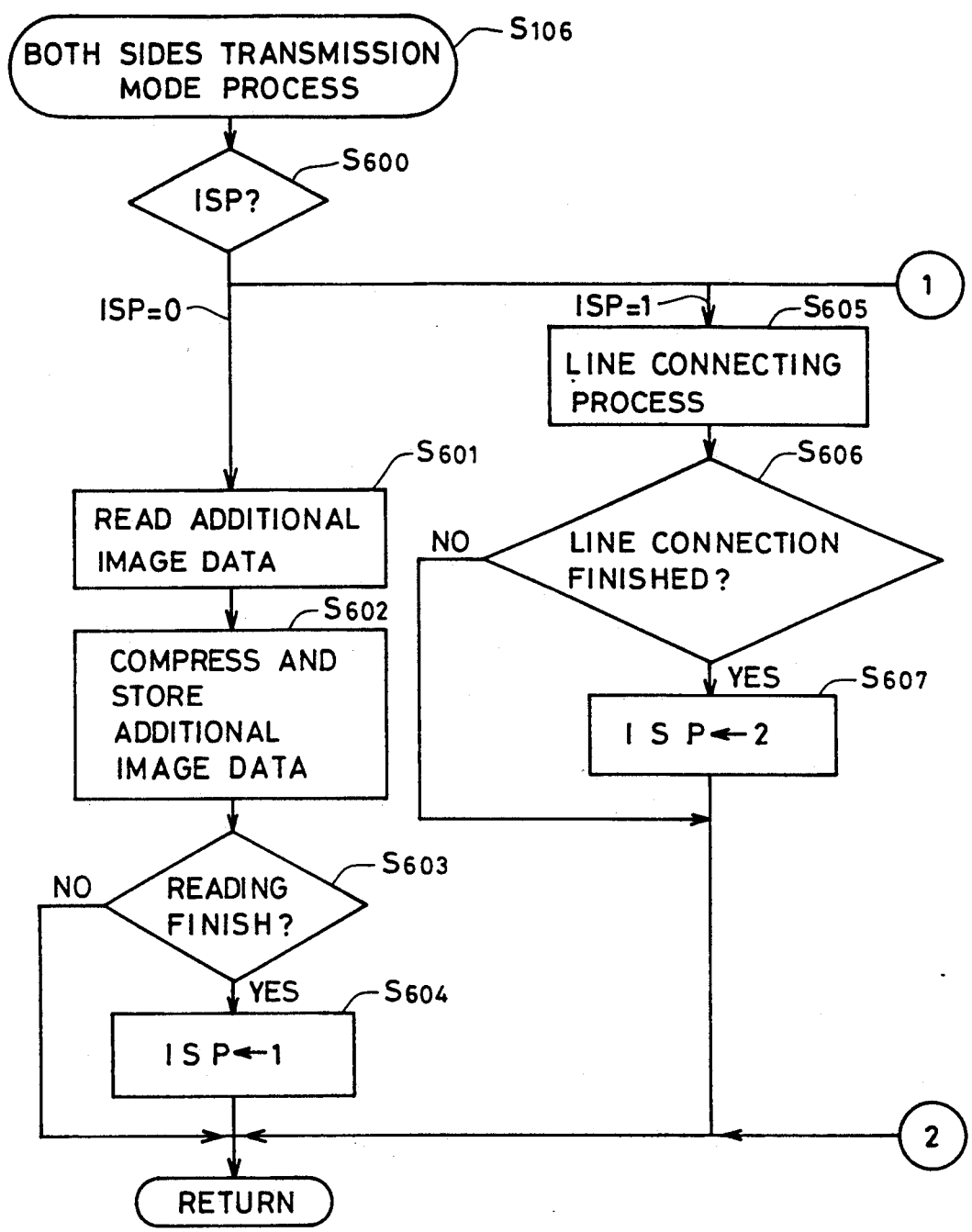
FIGS. 9A-9D are flow charts showing specific contents of the both-sides transmission mode process routine of FIG. 5.
Figure 9B:
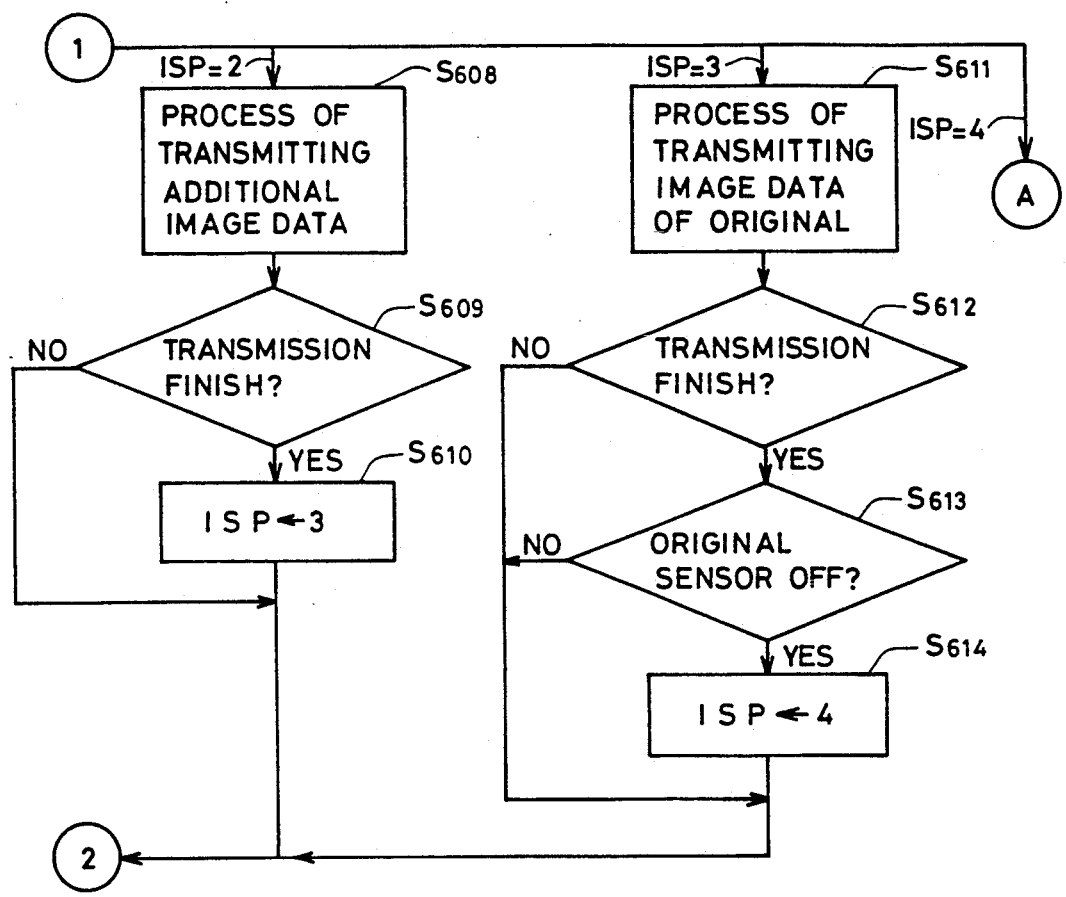
Figure 9C:
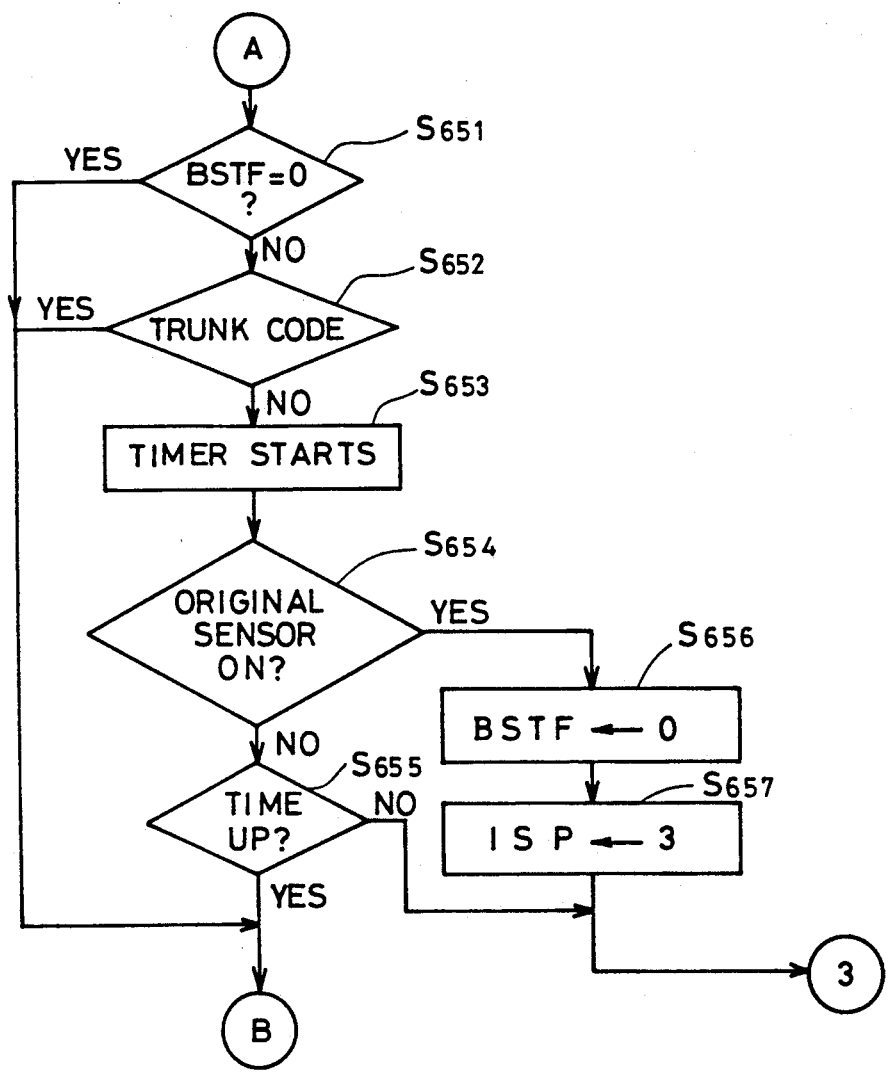
Figure 9D:
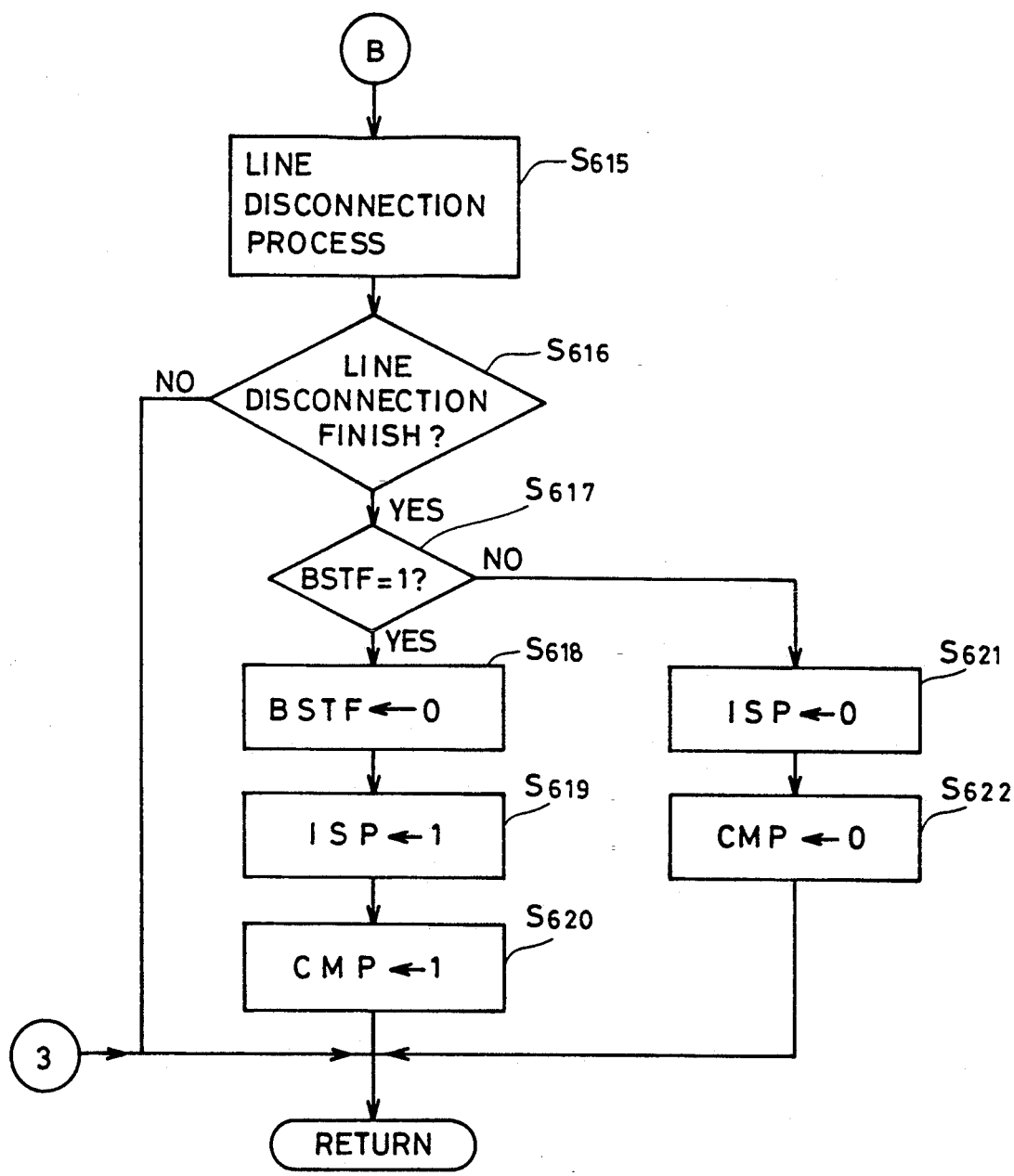

FIG. 7 is a flow chart showing specific contents of a first standby mode process (step S103) which is a subroutine of FIG. 5.

In FIG. 7, first, a determination is made as to whether the first transmission condition is satisfied or not in step S400. The first transmission condition includes the following three conditions, and when all the three conditions are satisfied, a determination is made that the first transmission condition is satisfied.

(1) An operator places originals on original tray 21 and original sensor 22 then detects the placed originals.

(2) A facsimile number of a destination is set with 10-key 52 and data of the set facsimile number is stored in RAM 73.

(3) Transmission key 53 is depressed.

When the first transmission condition is satisfied in the step S400 (YES in step S400), a determination is made as to whether the both-sides transmission flag BSTF is 0 or not in step S401. If the both-sides transmission flag BSTF is set to 0 (YES in step S401), the control mode parameter CMP is set to 2, and then the flow returns to the main routine. On the other hand, when the both-sides transmission flag BSTF is set to 1 in the step S401 (NO in step S401), the control mode parameter CMP is set to 3, and then the flow returns to the main routine.

When the first condition does not hold in the step S400 (NO in step S400), the flow proceeds to step S404 to make a determination as to whether a facsimile receipt requirement signal is received from a facsimile apparatus on the other party or not. Then, when the receipt requirement signal is received (YES in step S404), the flow proceeds to step S405 to set the control mode parameter CMP to 4, and then the flow returns to the main routine. On the other hand, when the receipt requirement signal is not received (NO in step S404), other processes are conducted in step S406, and then the flow returns to the main routine.

(d-4) second standby mode process

FIG. 8 is a flow chart showing specific contents of the second standby mode process (step S104) which is a subroutine of FIG. 5.

In FIG. 8, first, data of a facsimile number of the other party stored in RAM 73 is read out in step S500 and a determination is made as to whether the second transmission condition holds or not in step S501. The second transmission condition includes the following two conditions, and when all the two conditions hold, a determination is made that the second transmission condition holds.

(1) An operator places originals on original tray 21 in order to transmit back sides of duplex originals and original sensor 22 detects the placed originals.

(2) Transmission key 53 is depressed.

When the second transmission condition holds (YES in step S501), the flow proceeds to step S502 to set the control mode parameter CMP to 3, and the flow returns to main routine. On the other hand, if the second transmission condition is not satisfied in step S501 (NO in step S501), the flow proceeds to step S503 to make a determination as to whether a facsimile receipt requirement signal is received from a facsimile apparatus on the other party.

When a receipt requirement signal is received (YES in step S503), the flow proceeds to step S504 to set the control mode parameter CMP to 4, and then it returns to the main routine. On the other hand, if the receipt requirement signal is not received (NO in step S503), the flow proceeds to step S505 to perform other processes, and then it returns to the main routine.

(d-5) both-sides transmission mode process

FIGS. 9A-9D are flow charts showing the both-sides transmission mode process (step S106) which is a subroutine of FIG. 5.

In the figure, first, the internal state parameter ISP is checked in step S600, wherein when the internal state parameter ISP is 0, 1, 2, 3, and 4, the flow proceeds to step S601, S605, S608, S611, S651, respectively.

In step S601, the image of an additional original which is the first one of a plurality of originals placed on original tray 21 is read, and the read image is converted into image data (hereinafter, referred to as additional image data). Then, in step S602, the converted additional image data is compressed and stored in RAM 34.

Now, the additional original is an original in which something like "this facsimile transmission is of duplex originals. Original title: xxxx" is written which is prepared by an operator in advance. The additional original is read and stored prior to the transmission of the originals. The stored information of the additional original is transmitted prior to transmission of each group of originals in transmitting front sides of the originals and in transmitting the back sides. Thus, it is known on the receiving side that they are transmissions of the same group of originals.

Here, the following method may be also introduced. An original in which something like "This facsimile transmission is transmission of duplex originals. Image data of front sides of the duplex originals is now transmitted." (hereinafter, referred to as a first additional original) and an original in which something like "This facsimile transmission is transmission of duplex originals. Image data of back sides of the duplex originals is now transmitted" (hereinafter, referred to as a second original) are respectively prepared in advance by an operator as additional originals. The first additional original is placed at the beginning of the originals in transmitting image data of front sides of the duplex originals, and the second additional original is placed at the beginning of the originals when transmitting image data of back sides of the duplex originals. Then, prior to transmission of image data of front sides and transmission of image data of back sides, respectively, image data of the first and second additional originals may be transmitted. Thus, the receiving party can clearly recognize both of transmission of front sides and transmission of back sides. Especially, even when the line is disconnected between transmission of front sides and re-transmission of back sides, and image data is received from another facsimile apparatus in that period, the transmission of front sides and the transmission of back sides of the duplex originals can be clearly recognized.

Also, without such additional originals prepared by an operator, with the additional image data stored in ROM 72 in advance, the additional image data stored in ROM 72 may be transmitted to facsimile apparatus on the other party as a single sheet with a predetermined size in step S608. Also, without employing the additional originals, image data indicating front sides or back sides may be added to the beginning portion of image data of the first page and transmitted.

Subsequently, in step S603, a determination is made as to whether all the images of additional original has been read out and stored in RAM 34. When all the images of the additional original have been read out (YES in step S603), the flow proceeds to step S604, where internal state parameter ISP is updated to 1, and the flow returns to the main routine. On the other hand, when all the images of the additional original have not been completely read out (NO in step S603), the flow directly returns to the main routine.

After a predetermined line connecting process is performed for facsimile apparatus in step S605, the flow proceeds to step S606, where a determination is made as to whether the line connecting process has been completed or not. When the line connecting process has been completed (YES in step S606), the internal state parameter ISP is updated to 2 in step S607, and the flow returns to the main routine. On the other hand, when the line connecting process has not been completed (NO in step S606), the flow directly returns to the main routine.

After the transmission process of the additional image data stored in RAM 34 is carried out in step S608, a determination is made as to whether the transmission process of the additional image data has been completed or not in step S609. Now, when the transmission process is completed (YES in step S609), the flow proceeds to step S610, where internal state parameter RSP is updated to 3 and the flow returns to the main routine. On the other hand, when the transmission process is not completed (NO in step S609), it directly returns to the main routine.

In step S611, images of originals placed on original tray 21 are read out and compressed to be converted into a facsimile signal, which is transmitted to a facsimile apparatus on the other party. Subsequently, a determination is made as to whether the transmission process is completed or not in step S612, and a determination is made as to whether an original sensor 22 is OFF or not in step S613. When the transmission process is completed (YES in step S612) and the original sensor 22 is OFF (YES in step S613), internal state parameter ISP is updated to 4, and then the flow returns to the main routine. On the other hand, when the transmission process is not completed (NO in step S612) or when the original sensor is not OFF (NO in step S613), the flow directly returns to the main routine.

A determination is made as to whether the both-sides transmission flag BSTF is 0 or not in step S651, and subsequently a determination is made as to whether the facsimile number of the other party is a local office number or not in step S652. If the both-sides transmission flag BSTF is 0 (YES in step S651) or when the facsimile number includes a trunk code (YES in step S652), the flow proceeds to step S615 in order to immediately disconnect the line in consideration of the fee for telephone call.

On the other hand, when the both-sides transmission flag BSTF is not 0 (NO in step S651) and the facsimile number of the other party is a local office number (YES in step S652), the timer circuit 75 is started in step S653. Subsequently, a determination is made as to whether original sensor 22 is in an on state or not in step S654, and furthermore a determination is made as to whether the timer circuit 75 has timed for a predetermined time period and timed up or not in step S655. If the original sensor 22 is in an on state (YES in step S654), since originals have been placed for transmission of back sides of duplex originals, the flow proceeds to step S656, where the both-sides transmission flag BSTF is set to 0. Then, the internal state parameter ISP is updated to 3 in step S657, then the flow returns the main routine.

On the other hand, if the original sensor 22 is in off state in step S654 and the timer circuit 75 is not timed up (NO in step S655), it directly returns to the main routine.

In step S615, a process of disconnecting the line to the facsimile apparatus of the other party is performed according to predetermine procedures, and a determination is made as to whether the line disconnecting process has been completed or not in step S616. When the line disconnecting process is not completed (NO in step S616), it directly returns to the main routine. On the other hand, if the line disconnecting process is completed (YES in step S616), it proceeds to step S617, where a determination is made as to whether the both-sides transmission flag BSTF is 1 or not.

When the both-sides transmission flag BSTF is 1 (YES in step S617), the both-sides transmission flag BSTF is reset to 0 to cancel the both-sides transmission mode in step S618. Subsequently, the internal state parameter ISP is set to 1 in step S619, and the control mode parameter CMP is set to 1 in step S620, and then it returns to the main routine. In this case, LED 56 is turned off in the following input/output process (refer to FIG. 6, step S101).

On the other hand, when the both-sides transmission flag BSTF is 0 in step S617 (NO in step S617), the internal state parameter ISP is set to 0 in step S621, and then the control mode parameter CMP is set to 0 in step S622. Then, the flow returns to the main routine.

In the above-described embodiment, a transmission process of additional image data is performed, but the present invention is not limited to the same, and it may be configured not to transmit additional image data.

Also, in the present embodiment, transmission is made in two groups of front and back sides, but three or more groups of originals can be similarly transmitted.

Referring to figures, processes of facsimile apparatus which is the second embodiment of the present invention will be described below in the order of the following items. The configuration of the facsimile apparatus, an operation panel and a main control portion are same as those in the first embodiment, so that the description thereof is not repeated here.

(d-1) main routine
(d-2) input/output process
(d-3) standby mode process
(d-4) transmission mode process Facsimile apparatus of the present embodiment is characterized by having a both-sides transmission mode, wherein, when transmitting duplex originals which are paged in the order of the front side, the back side of the first sheet, the front side, the back side of the second sheet . . . (further continues), first, front sides of the originals are read by an image sensor 26 and the read images are converted into image data and sequentially stored in even number addresses of RAM 34. Subsequently, back sides of the originals are read by image sensor 26, and the read images are converted into image data to be sequentially stored at odd number addresses of RAM 34. Then, the image data of the originals stored in the RAM 34 is transmitted to the facsimile apparatus on the other party in the order of pages.

(d-1) main routine

Figure 10:
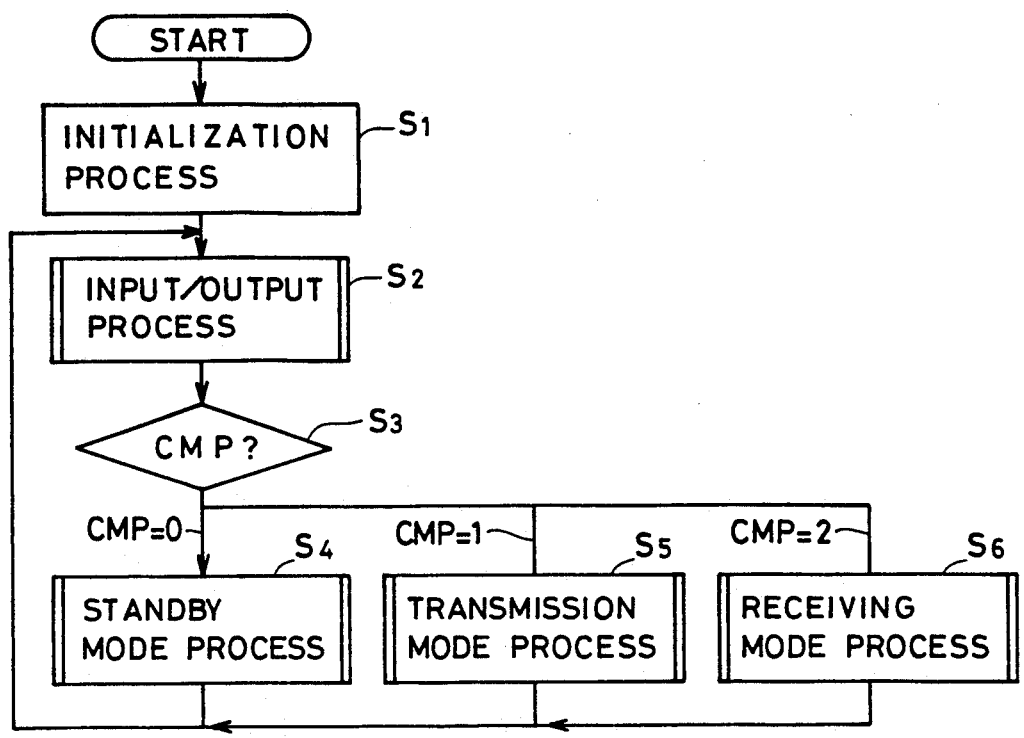
FIG. 10 is a flow chart showing a main routine of the main control portion according to the second embodiment of the present invention.

FIG. 10 is a flow chart showing a main routine of a main controlling portion of FIG. 4 shown in the first embodiment.

In FIG. 10, when a power supply of facsimile apparatus of the present embodiment is turned on, the processes of the main routine are started, where an initialization process is made in step S1. The above-described control mode parameter CMP, both-sides transmission flag BSTF, and internal state parameter ISP are reset to 0 in the initialization process. Subsequently, an input/output process is made in step S2. In the input/output process, setting of the both-sides transmission mode flag BSTF and processing of turning on or off of LED 56 on the basis of depression of a both-sides transmission key, and the process of setting a facsimile number of the other party, etc. are performed.

Furthermore, in step S3, the control mode parameter CMP is checked. When the control mode parameter CMP is 0, the flow proceeds to step S4, where the standby mode process is conducted in which a control mode parameter CMP is set according to satisfaction of transmission conditions and receipt of a facsimile signal from the other party, and then it returns to step S2.

When the control mode parameter CMP is 1 in step S3, the flow proceeds to step S5, wherein the transmission mode process which will be described later in detail is conducted, and it returns to step S2.

Furthermore, when the control mode parameter CMP is 2 in step S3, it proceeds to step S6 for the receiving mode process, and then it returns to step S2. In the receiving mode process, similarly to a receiving process of a conventional facsimile apparatus, processes of line connection from facsimile apparatus on the other party, of receiving a facsimile number, of converting into an image signal, and of printing are performed.

(d-2) input/output process

The input/output process is the same as the process in the first embodiment, so that the description thereof is not repeated here.

(d-3) standby mode process

Figure 11:
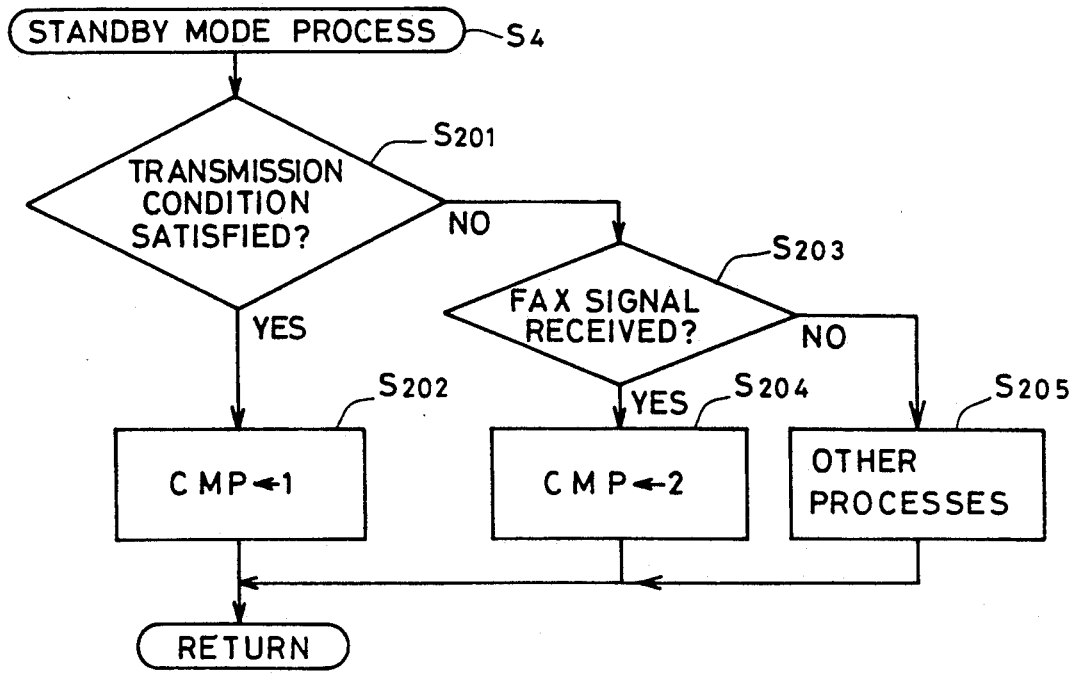
FIG. 11 is flow chart showing specific contents of the standby mode process routine of FIG. 10.

FIG. 11 is a flow chart showing specific contents of the standby mode process (step S4) which is a subroutine of FIG. 10.

In FIG. 11, first, a determination is made as to whether the transmission conditions are satisfied in step S201. The transmission conditions include the following three conditions, and when all the three conditions are satisfied, a determination is made that the transmission conditions hold.

(1) An operator places originals on original tray 21 and the original sensor 22 detects the placed originals.

(2) A facsimile number of the other party is set with ten-key 52, and the data of the set facsimile number is stored in RAM 73.

(3) Transmission key 53 is depressed.

When the above-described transmission conditions hold in step S201 (YES in step S201), a control mode parameter CMP is set to 1 in step S202, and then it returns to the main routine. On the other hand, if the above-described transmission conditions do not hold in the step S201 (NO in step S201), the flow proceeds to step S203, where a determination is made as to whether a facsimile receiving request signal is received from the facsimile apparatus on the other party. When a receipt requesting signal is received (YES in step S203), the flow proceeds to step S204, wherein the control mode parameter CMP is set to 2, and then it returns to the main routine. On the other hand, when a receipt requiring signal is not received (NO in step S203), after performing other processes in step S205, it proceeds to the main routine.

(d-4) transmission mode process

Figure 12:
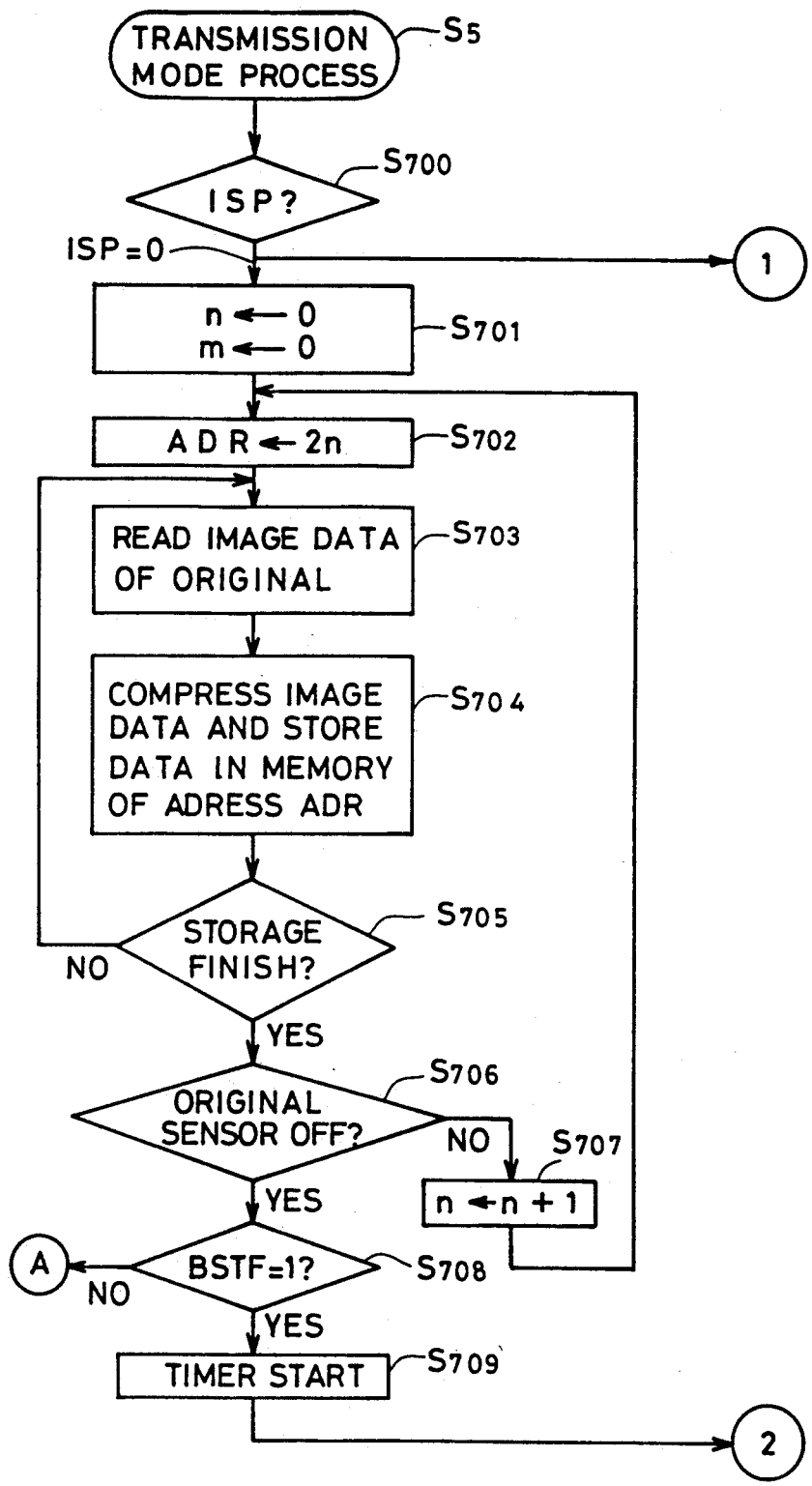
FIGS. 12A-12D are flow charts showing specific contents of the transmission mode process routine of FIG. 10.
Figure 12C:
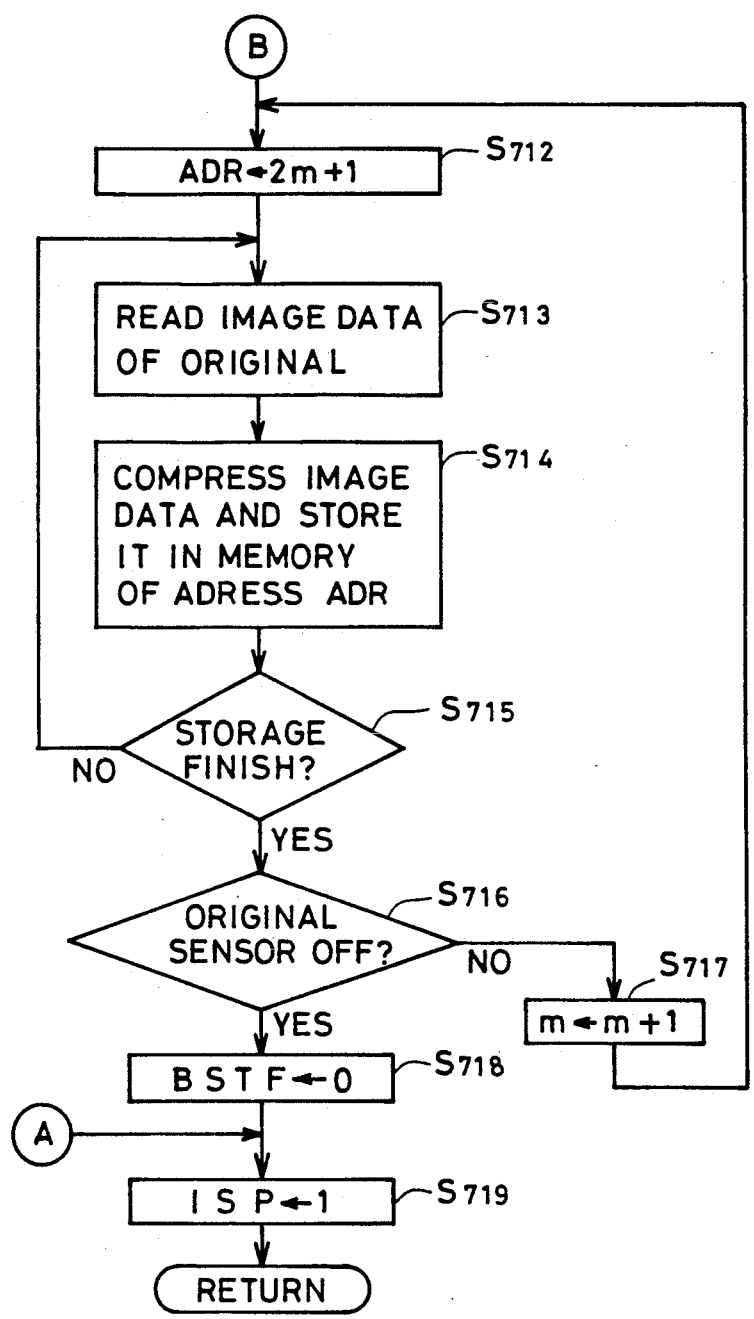
Figure 12D:
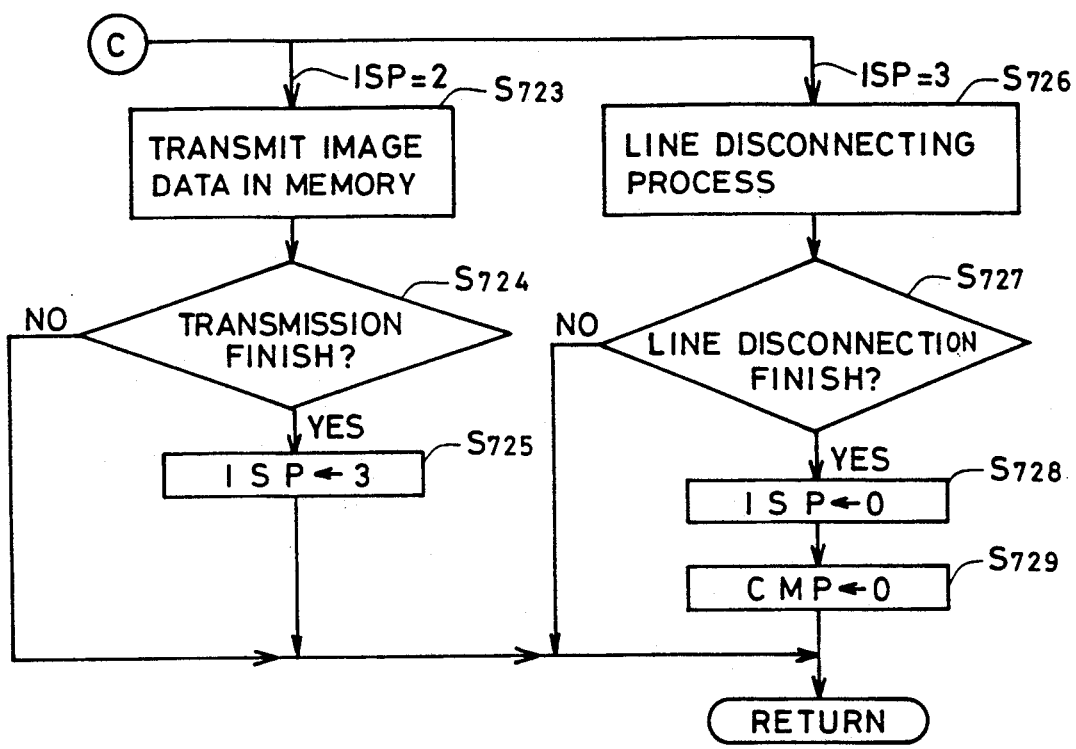

FIGS. 12A-12B are flow charts indicating specific contents of the transmission mode process (step S5) which is a subroutine of FIG. 10.

In the present embodiment, when both-sides transmission key 55 is depressed to select a both-sides transmission mode, an operator first places duplex originals on original tray 21 so that the front sides of the duplex originals are read out and then places duplex originals on original tray 21 so that the back sides of the duplex originals are read until a predetermined time counted by timer circuit 75. On the other hand, when the both-sides transmission mode is not selected, the operator places originals on original tray 21 so that the original images of the single-side originals are read. It is assumed that an image for a single side of a sheet of original can be stored in a single page address ADR of RAM 34.

In the figure, first, the internal state parameter ISP is checked in step S700, where when the internal state parameter ISP is 0, 1, 2, and 3, respectively, the flow proceeds to step S701, S720, S723 and S726.

Parameters m and n are respectively reset to 0 in step S701, and then 2n is set in page address ADR in step S702. Subsequently, one of the originals placed on original tray 21 is fed to image sensor 26 so that the image of the original is read by the image sensor 26 in step S703, and the read image is subjected to a predetermined compression process and stored in even number page address ADR (=2n) of RAM 34 in step S704.

Next, in step S705, a determination is made as to whether the reading process for the image of the sheet of original, the compression process and the storing process into RAM 34 are completed or not, and if they are not completed (NO in step S705), it returns to step S703 for a process of reading original, and on the other hand, if they are completed (YES in step S705), it proceeds to step S406.

A determination is made as to whether original sensor 22 is in an off state or not in step S706. If the original sensor 22 is not in an off state (NO in step S706), a value obtained by adding 1 to the parameter n (n+1) is set at the parameter n in step S707, and then it returns to step S702. On the other hand, if the original sensor 22 is in an off state (YES in step S706), a determination is made that image of a single side of an original has been read, and then a determination is made as to whether the both-sides transmission flag BSTF is 1 or not in step S708.

When the both-sides transmission flag BSTF is not 1 in the step S708, since there is no need to read the original images on the back side, the flow proceeds to step S719 where the internal state parameter ISP is set to 1, and it returns to main routine. If the both-sides transmission flag BSTF is 1 in the step 708 (YES in step S708), the flow proceeds to step S709, where timer circuit 75 of main control portion 39 is started. Then, a determination is made as to whether original sensor 22 is in on state or not in step S710.

If the original sensor 22 is in an on state (YES in step S710), the duplex original is being placed on original tray 21 so that its back side is read out, so that the flow proceeds to step S712 in order to read the image of the back side. On the other hand, if the original sensor 22 is not in an on state (NO in step S710), the flow proceeds to step S711, where a determination is made as to whether timer circuit 75 has counted a predetermined time and timed up. If timer circuit 75 is not timed up in step S711 (NO in step S711), the flow returns to step S710. On the other hand, if it has timed up (YES in step S711), a determination is made that the operator selected the both-sides transmission mode but does not intend to transmit image data of back sides of originals, and the flow proceeds to S719. Then, after setting and updating the internal state parameter ISP to 1, it returns to the main routine.

After setting a value of (2m+1) at the page address ADR in step S712, one of the originals placed on original tray 21 is sent toward image sensor 26 so that the image of the original is read by the image sensor 26 in step S713. Then, in step S714, the read image is subjected to a predetermined compression process and then the image data after the process is stored in the odd page address ADR (2m+1) of RAM 34.

Subsequently, in step S715, a determination is made as to whether or not the reading process, compression process and storing process into RAM 34 for an image for a single sheet of original are completed or not. If they are not completed (NO in step S715), it returns to step S713 for reading process of the original, and on the other hand, if they are completed (YES in step S715), the flow proceeds to step S716.

A determination is made as to whether the original sensor 22 is in an off state or not in step S716. If the original sensor 22 is not in an off state (NO in step S716), a value obtained by adding 1 to the parameter m (m+1) is set at the parameter m in step S717 in order to read the next original placed on original tray 21, and the flow returns to step S712. On the other hand, if the original sensor 22 is in an off state (YES in step S716), the both-sides transmission flag BSTF is reset to 0 in step S718, and the internal state parameter ISP is updated to 1, and then it returns to the main routine.

In step S720, the calling process is conducted with a facsimile number of the other party inputted by an operator using ten-key 52 to implement a predetermined line connecting process for the facsimile apparatus on the above other party. Subsequently, the flow proceeds to step S721, where a determination is made as to whether the line connecting process is completed or not. When the line connecting process is completed (YES in step S721), the internal state parameter ISP is set to 2 in step S722, and then it returns to the main routine. On the other hand, if the line connecting process is not completed (NO in step S721), it directly returns to the main routine.

In step S723, the image data stored in RAM 34 is read from page address ADR0 in ascending order, that is, in the order of pages of originals, and then they are converted into a predetermined facsimile signal to be transmitted to the facsimile apparatus on the other party through the telephone line 30. If image data of a single-side original or only of one side due to time-up in step S711 is stored in RAM 34, the image data of page addresses ADR of even numbers are read. Subsequently, a determination is made as to whether the transmission process is completed or not in step S724. When all the image data stored in RAM 34 is transmitted (YES in step S724), the internal state parameter ISP is set to 3 and update, and then the flow returns to the main routine. On the other hand, when the transmission process is not completed (NO in step S724), the flow directly returns to the main routine.

In step S726, the processing of disconnecting the line to the facsimile apparatus on the other party is performed according to predetermined procedures, and then a determination is made as to whether the line disconnecting process is completed or not in step S727. When the line disconnecting process is not completed (NO in step S727), it directly returns to the main routine. On the other hand, when the line disconnecting process is completed (YES in step S727), the internal state parameter ISP is reset to 0 in step S728, and then the control mode parameter CMP is reset to 0 in step S729, then it returns to the main routine.

In the above-described second embodiment, when reading a front side of a duplex original, the read image data is stored in an even number page address of RAM 34. The image data of an image read in reading a back side of the duplex original is stored in an odd number page address of RAM 34. And then the image data is read from RAM 34 in the order of pages to be transmitted. The present invention is not limited to the same, however, the image data of the image which is read in reading a front side of the duplex original may be stored in an odd number page address of RAM 34. The image data of the image which is read in reading a back side of the duplex original may be stored in a page even number address of RAM 34, and then the image data may be read in the order of the pages of the originals from RAM 34 and transmitted. Otherwise, the image data of the image which is read in reading a front side of the duplex original may be stored in RAM 34 in ascending or descending order of the addresses. The image data of the image which is read in reading a back side of the duplex original may be stored in addresses of RAM 34 different from those for the image data of the front sides in ascending or descending order of the addresses, and then the image data may be read in the order of pages of the originals from RAM 34 and transmitted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile apparatus, comprising:

a placing portion on which an original to be transmitted is placed;

detecting means for detecting that the original is placed on said placing portion;

transmission destination setting means for setting a destination to which an image of the original placed on said placing portion is transmitted;

reading means for reading the image of the original placed on said placing portion to output an image signal;

transmitting means for transmitting the image signal outputted from said reading means to the transmission destination set by said setting means;

mode specifying means for specifying a mode in which an image signal of an original of a first group placed on said placing portion is transmitted to the transmission destination set by said setting means, and then an image signal of an original of a second group, which is different from the first group of original, placed on said placing portion is transmitted to the destination same as that of the first group of original; and controlling means for controlling said transmitting means so that, when a transmission destination is set by said setting means and it is detected by said detecting means that an original is placed on said placing portion, an image signal of the original placed on said placing portion is transmitted to said transmission destination, and controlling said transmitting means so that, if said mode is specified by said mode specifying means, an image signal of the original in said second group is transmitted to the same transmission destination as that to which the image signal of the original in said first group is transmitted when an original of said second group placed on said placing portion is detected by said detecting means after the image signal of the original of said first group is transmitted to the transmission destination set by said setting means.

2. The facsimile apparatus according to claim 1, wherein said transmitting means has a line controlling portion for controlling connection conditions of the line to the transmission destination to which the image signal is to be transmitted, and said controlling means controls said line controlling portion so that the line connection with the transmission destination is maintained even after transmission of the image signal of said first group of original is completed when said mode is specified by said mode specifying means.

3. The facsimile apparatus according to claim 2, wherein said controlling means has a timer, and controls said line controlling portion so that the line to said destination is disconnected when said detecting means does not detect said second group of original placed until the timer counts a predetermined time from when the transmission of the image signal of said first group of original is transmitted.

4. The facsimile apparatus according to claim 1, wherein said first group of original includes an original comprising a front side of duplex original, and said second group of original includes an original comprising back side of said duplex original.

5. A facsimile apparatus comprising:

placing portion on which an original to be transmitted is placed;

detecting means for detecting that the original is placed on said placing portion;

transmission destination setting means for setting a transmission destination to which an image of the original placed on said placing portion is transmitted;

storing means for storing the transmission destination set by said setting means;

reading means for reading the image of the original placed on said placing portion to output an image signal;

transmitting means having a line connection portion to switch the connection condition of line to the transmission destination stored in said storing means, for connecting the line with said transmission destination to transmit the image signal outputted from said reading means;

mode specifying means for specifying a mode in which a plural groups of originals sequentially placed on said placing portion are transmitted to the transmission destination set by said setting means;

first controlling means for making control so that, when the original in a first group in said plural groups is detected by said detecting means and a transmission destination is set by said setting means, the set transmission destination is stored by said storing means, the line is connected to said stored transmission destination by said line connecting means, the image signal of the original of said first group outputted from said reading means is transmitted by said transmitting means, and the line is disconnected from said transmission destination by said line connecting portion when the transmission of the image signal of said first group of original is finished; and second controlling means for making a control so that, if said mode is specified by said mode specifying means, said line connecting portion connects the line to the transmission destination stored in said storing means, said transmitting means transmits an image signal of an original of a second group of said plural groups outputted from said reading when said detecting means detects the original of said second group different from said first group in said plural groups after transmission by said first control means, and said line connecting portion disconnects the line to said transmission destination when the transmission of the image signal of said second group of original is finished.

6. The facsimile apparatus according to claim 5, further comprising; information transmitting means for transmitting information related to each of said plural groups to said transmission destination every time the line is connected to the transmission destination by said controlling means.

7. The facsimile apparatus according to claim 5, wherein said first group of original includes an original comprising a front side of a duplex original, and said second group of original includes an original comprising a back side of said duplex original.

8. A facsimile apparatus, comprising:
placing portion on which an original to be transmitted is placed;
detecting means for detecting that the original is placed on said placing portion;
transmission destination setting means for setting a transmission destination to which an image of the original placed on said placing portion is transmitted;
reading means for reading the image of the original placed on said placing portion to output image data corresponding to the read image;
storing means for storing the image data outputted from said reading means;
transmitting means for converting the image data stored in said storing means into an image signal and transmitting the image signal to the transmission destination set by said setting means;
mode specifying means for specifying a mode in which image signals of a first group of original and second group of original placed on said placing portion are alternately transmitted; and
controlling means for controlling said storing means so that, if said mode is specified by said mode specifying means, in response to setting of the transmission destination by said setting means and detection by said detecting means, the image data of said first group of original placed on said placing portion is stored into said storing means, and subsequently, in response to detection by said detecting means, the image data of said second group of original placed on said placing portion is stored in said storing means, and for controlling said transmitting means so that the image data of the original of said first group and said second group stored in said storing means are alternately read out, converted into image signals and transmitted to the transmission destination set by said setting means.

9. The facsimile apparatus according to claim 8, wherein said storing means includes two areas, said controlling means stores image data of said first group in one area of said storing means and stores the image data of said second group in the other area of said storing means, and said transmitting means reads image data alternately from respective areas of said storing means.

10. The facsimile apparatus according to claim 8, wherein said controlling means controls said storing means so that the image data of said first group is sequentially stored in even number addresses of said storing means and the image data of said second group is sequentially stored in odd number addresses of said storing means and controls said transmitting means so that image data are read out in order from a predetermined address of said storing means and transmitted.

11. The facsimile apparatus according to claim 8, wherein said first group of original includes an original comprising a front side of a duplex original and said second group of original includes an original comprising a back side of said duplex original.

* * * * *

UNITED STATES PATENT AND TRADEMARK OFFICE
CERTIFICATE OF CORRECTION

PATENT NO. : 5,289,290

DATED : February 22, 1994

INVENTOR(S) : Hiroyuki Suzuki, et al.

It is certified that error appears in the above-identified patent and that said Letters Patent is hereby corrected as shown below:

In col. 16, line 33, (claim 5, line 22), change "originals" to --original--.

In col. 16, line 58 (claim 5, line 47), after "reading" insert --means--.

Signed and Sealed this

Sixteenth Day of August, 1994

Attest:

BRUCE LEHMAN

Attesting Officer

Commissioner of Patents and Trademarks